United States Patent [19]

Eldridge

[11] Patent Number: 4,978,068
[45] Date of Patent: Dec. 18, 1990

[54] EXHAUST HEATED SPREADER

[76] Inventor: Stanley W. Eldridge, P.O. Box 273 Mass Ave., Center Ossipee, N.H. 03814

[21] Appl. No.: 525,307

[22] Filed: May 18, 1990

Related U.S. Application Data

[63] Continuation of Ser. No. 369,316, Jun. 20, 1989, abandoned.

[51] Int. Cl.⁵ .............................................. B05B 1/24
[52] U.S. Cl. ................................... 239/129; 239/654; 298/1 A; 298/1 H; 404/95; 37/228
[58] Field of Search ................ 37/227, 228, 196, 199; 404/95; 239/129, 654; 291/20; 298/1 H, 1 A; 105/247, 451

[56] References Cited

U.S. PATENT DOCUMENTS

| | | | |
|---|---|---|---|
| 731,672 | 6/1903 | Eberlein | 105/451 |
| 2,766,705 | 10/1956 | Flowers | 105/451 |
| 2,881,024 | 4/1959 | Saiberlich | 298/1 A |
| 2,925,301 | 2/1960 | Milligan | 37/227 X |
| 3,331,433 | 7/1967 | Hagberg | 37/228 X |
| 3,499,678 | 3/1970 | Richler | 298/1 H |
| 4,623,197 | 11/1986 | Shuka | 298/1 H |

FOREIGN PATENT DOCUMENTS

| | | | |
|---|---|---|---|
| 637473 | 12/1978 | U.S.S.R. | 239/129 |
| 712298 | 1/1980 | U.S.S.R. | 105/451 |
| 715047 | 2/1980 | U.S.S.R. | 239/129 |

*Primary Examiner*—Randolph A. Reese
*Assistant Examiner*—Arlen L. Olsen
*Attorney, Agent, or Firm*—Choate, Hall & Stewart

[57] ABSTRACT

An apparatus and method for heating snow traction-improving material contained in a bin mounted on a motor vehicle, such as a truck. Panels are attached to the side of the bin to form a sealed cavity surrounding the bin. Hot exhaust from the motor vehicle engine is then piped into and flows through the cavity so as to heat the cavity, whereby heat from the cavity warms the contents of the bin. The exhaust then flows out an exit portal from the cavity to permit continued flow-through. Provision is made to form holes in any buttress supports, supporting the bin on the truck, which might obstruct the flow of hot exhause. Finally, a drain is provided, allowing any condensation formed in the cavity to escape.

3 Claims, 1 Drawing Sheet

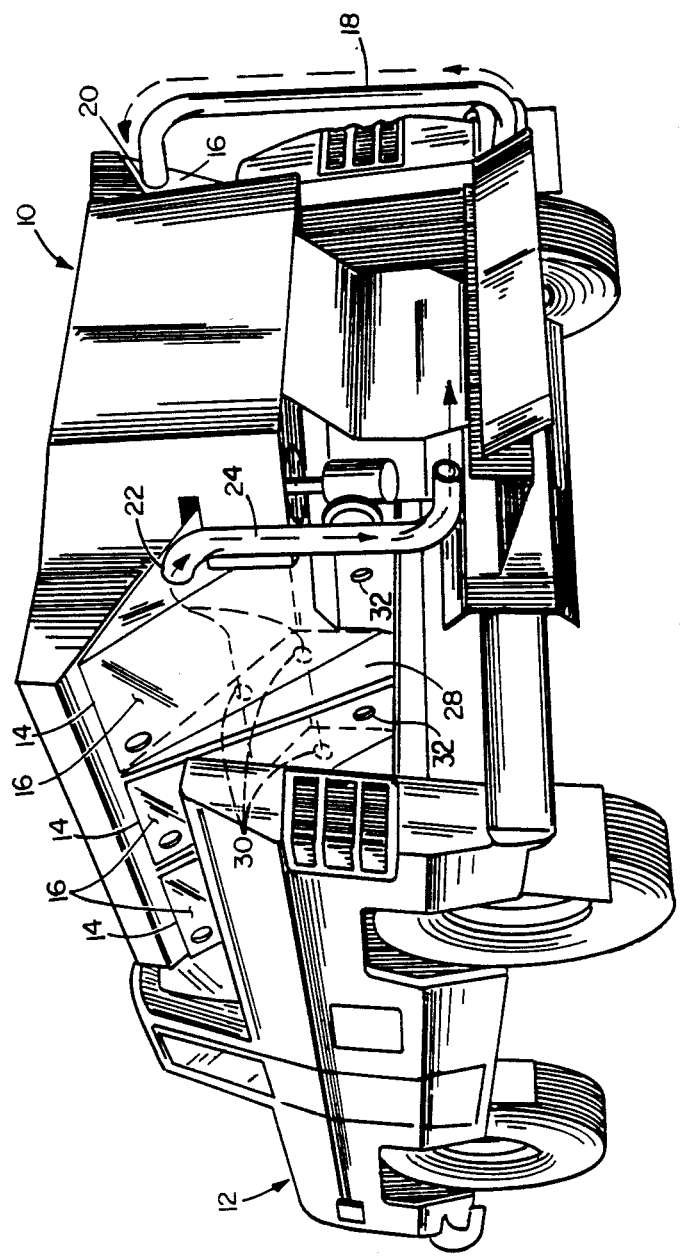

EXHAUST HEATED SPREADER

This is a continuation of copending application Ser. No. 07/369,316 filed on Jun. 20, 1989, now abandoned.

BACKGROUND OF THE INVENTION

This invention relates to snow removal equipment and, more particularly, to motor vehicles which deposit on thoroughfares substances which melt ice and snow or otherwise reduce slipperiness of the thoroughfare.

During the winter in colder climates, fallen snow on streets and thoroughfares often reduces the traction of motor vehicles, and thus presents a safety hazard. One method of alleviating this hazard involves spreading of sand or other coarse, grained material to reduce slipperiness, or alternatively, to spread salt or other material which causes ice to melt, even at temperatures below 0° C. When the temperature of the material to be spread is higher than the snow to be melted, the process is much more efficient. The spreading is performed by placing the salt, sand, or comparable material (known herein throughout as "traction-improving material") into a large bin mounted on the rear end of a motor vehicle, such as a truck. The bin is equipped with an ejection manifold to slowly permit escape of the traction-improving material, draining the bin and releasing the material onto the street surface.

One problem that frequently develops in this method, however, is that in subzero temperatures, moisture in the traction-improving material freezes, causing the particles of traction-improving material to bind together. This, in turn, causes clumping of the traction-improving material which may block the ejection manifold of the bin, preventing the traction-improving material from being released. Further, the traction-improving material may freeze together in a block such that none can be released. Prior methods of solving the clumping problem largely involve physically breaking the clumps or blocks of traction-improving material apart into sizes small enough for release. One such method is to repeatedly strike the exterior side of the bin so that the clumps or blocks break. Another method involves striking the material directly with an instrument—a pick, or a shovel, for example—in order to break the clumps or blocks apart.

These methods are not satisfactory for a number of reasons. First, it is frequently difficult and time consuming to break the clumps or blocks into pieces of small enough size to permit release. Further, the effects of such methods are often deleterious to the bin and may significantly reduce its use life. Repeatedly striking the side of the bin may promote metal fatigue and the formation of cracks. Striking the material in the bin directly may have the same effects, or worse, in that such striking presents the possibility of directly punching holes in the side of the bin.

A need has therefore been felt for a method and apparatus for reducing or eliminating clumping of traction-improving materials due to frozen moisture.

SUMMARY OF THE INVENTION

The applicant herein discloses an apparatus for eliminating clumping of traction-improving material in the bin due to frozen moisture.

The apparatus includes panels—for example, of metal—which are attached (welded in the example) to the sides of the traction-improving material container bin mounted on the rear end of a motor vehicle. These panels, together with the sides of the bin, form a sealed cavity between the panels and the bin. Piping extends from the exhaust manifold of the engine of the vehicle to the entrance portal of the cavity formed as described. In this manner, the hot exhaust from the engine flows from the manifold through the pipe to the cavity, where it circulates around the sides of the bin, warming the contents. So that the exhaust may flow through the cavity, an exit portal and conduit are provided. Further there is a small drain at the bottom of the sealed cavity to permit condensation formed therein to be released.

The bin is supported on its exterior sides by solid buttress supports. The buttress supports project orthogonally from the exterior sides of the bin, and the invention envisions forming holes through the supports so that the exhaust may flow freely through the cavity and out of the exit portal.

BRIEF DESCRIPTION OF THE DRAWING

The FIGURE included herewith is a representation of the preferred embodiment of the instant invention mounted on the rear end of a pick-up truck.

DESCRIPTION OF THE PREFERRED EMBODIMENT

The preferred embodiment is best illustrated in the FIGURE. The bin (10) containing traction-improving material and an ejection manifold (34) to slowly permit escape of the traction-improving material is mounted on a truck (12). Panels (14) are attached onto the side of the bin, creating the sealed cavity (16). Piping (18) runs from the exhaust manifold of the engine (not shown) to the entrace portal (20) of the sealed cavity (16). The exit portal (22) and conduit (24) permit excape of the exhaust after flowing through the sealed cavity. A small drain (32) may be provided at the bottom of the sealed cavity (16) to permit release of any accumulated condensation.

The solid buttress supports (28) project orthogonally from the exterior sides of the bin. Holes (30) are formed in those portions of the supports contained within the cavity to allow free flow of exhaust through the cavity.

Other embodiments are within the following claims:

I claim:

1. An apparatus for heating traction-improving material contained in a bin mounted on a motor vehicle, said bin, having an ejection manifold to slowly permit escape of said traction-improving material, attached and supported on the motor vehicle by solid buttress supports, said solid buttress supports projecting orthogonally from the exterior side walls of the bin, said apparatus comprising:

panels, attached to the exterior side walls of the bin so as to form a sealed cavity between the exterior side walls of the bin and the panels, said panels attached such that a portion of each of said solid buttress supports is contained within said cavity;

holes formed through said portions of said solid buttress supports contained within said sealed cavity, so as to permit free flow of the hot exhaust through said cavity;

piping, operatively connecting an exhaust manifold of the motor vehicle engine to a sealed cavity entrance portal positioned proximately to said ejection manifold; and a sealed cavity exit portal positioned proximately to said ejection manifold to permit escape of hot exhaust after flowing through the sealed cavity.

2. The apparatus of claim 1, further comprising a small drain at the bottom of the sealed cavity, for release of condensation caused by the hot exhaust.

3. A method for heating traction-improving material contained in a bin mounted on a motor vehicle, said bin, having an ejection manifold to slowly permit escape of said traction-improving materia, attached and supported on the motor vehicle by solid buttress supports, said solid buttress supports projecting orthogonally from the exterior sides of the bin, said method comprising:

attaching panels to the exterior side walls of the bin so as to form a sealed cavity between the exterior side walls of the bin and the panels, said panels attached such that a portion of each of said solid buttress supports is contained within said cavity;

forming holes through said portions of said solid buttress supports contained within said sealed cavity, so as to permit free flow of the hot exhaust through said cavity;

operatively connecting piping from an exhaust manifold of the motor vehicle engine to a sealed cavity entrance portal positioned proximately to said ejection manifold; and providing a sealed cavity exit portal positioned proximately to said ejection manifold to permit escape of hot exhaust flowing through the sealed cavity.

* * * * *